R. DE W. THOMPSON.
STALK CUTTER.
APPLICATION FILED DEC. 2, 1916.
1,255,068.
Patented Jan. 29, 1918.
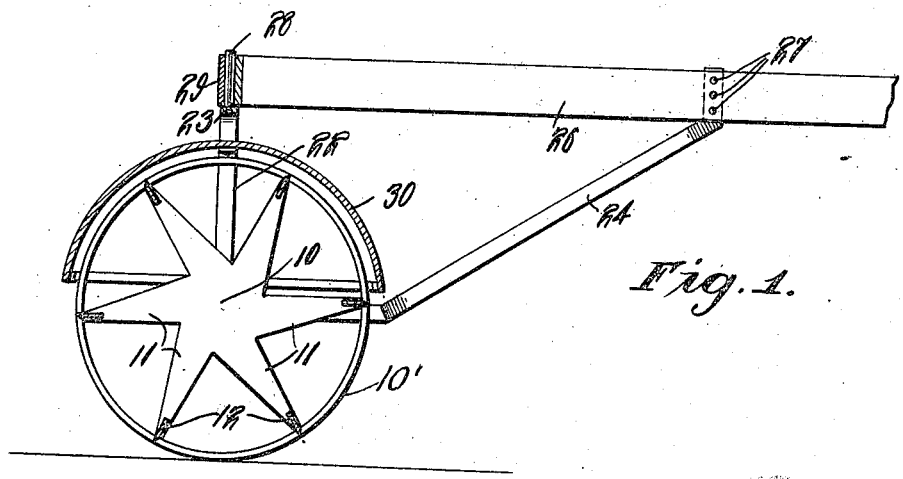
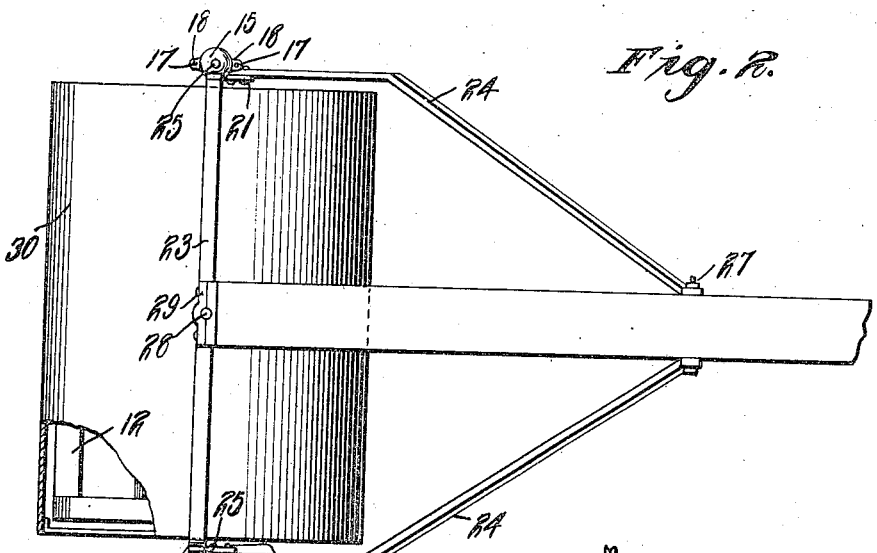
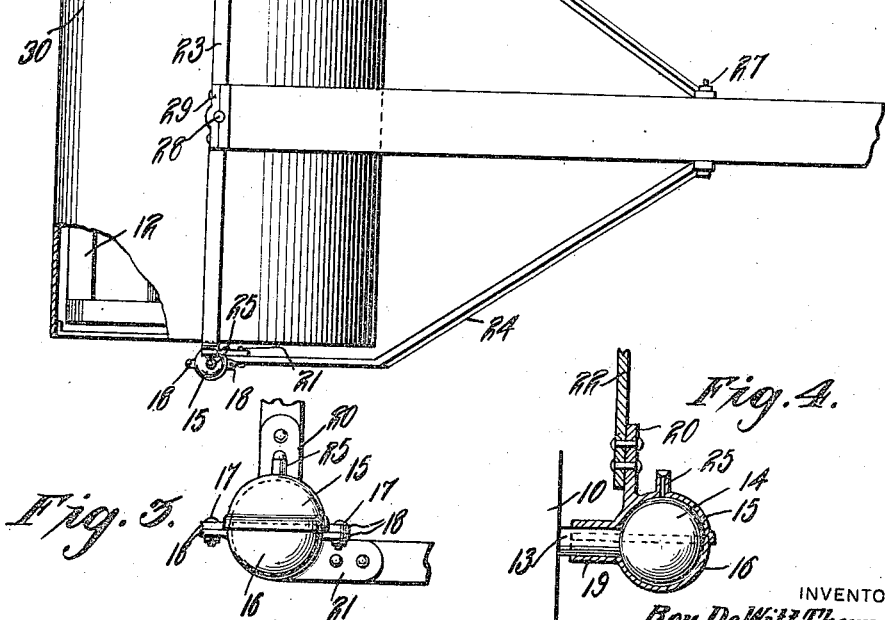
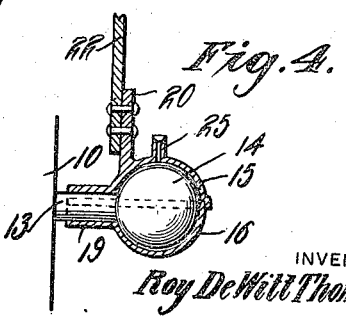
INVENTOR
Roy DeWitt Thompson
WITNESSES
BY
ATTORNEY

UNITED STATES PATENT OFFICE.

ROY DE WITT THOMPSON, OF TOLBERT, TEXAS.

STALK-CUTTER.

1,255,068.                    Specification of Letters Patent.        Patented Jan. 29, 1918.

Application filed December 2, 1916.   Serial No. 134,680.

*To all whom it may concern:*

Be it known that I, ROY DE WITT THOMPSON, a citizen of the United States, residing at Tolbert, in the county of Wilbarger and State of Texas, have invented certain new and useful Improvements in Stalk-Cutters, of which the following is a specification.

This invention relates to an improved stalk cutter and the principal object of the invention is to provide a stalk cutter so constructed that it may be connected with a lister beam, thus permitting the stalk cutter to be connected with the lister and thus the stalks cut during the operation of plowing.

Another object of the invention is to provide an improved type of bearing for the drum, the bearing being so constructed that the supporting yoke and arm may be connected by the bearing.

Another object of the invention is to so construct this improved bearing that the housing thereof may be formed in two parts easily disconnected when so desired.

Another object of the invention is to provide an improved type of drum for carrying the cutting blades.

Another object of the invention is to so construct this stalk cutter that a hood for the drum may be connected with the yoke.

This invention is illustrated in the accompanying drawings, wherein:—

Figure 1 is a view showing the improved stalk cutter in vertical section,

Fig. 2 is a view showing the improved drum in top plan, one portion of the protecting hood being broken away, Fig. 3 is a view showing one of the improved bearings in elevation, and Fig. 4 is a view showing the improved bearing in section with the stub-shaft of the drum in elevation.

This improved stalk cutter includes a drum having heads 10 which are provided with arms 11, the arms being braced by bands or rings 10' and carrying the cutting blades 12. A stub shaft 13 extends from each of the heads 10 and terminates in a spherical head or outer end portion 14 mounted in the socket bearing shown in Figs. 3 and 4. These socket bearings are each provided with an upper section or cup 15 and a lower section or cup 16 connected by the bolt 17 passing through the ears 18 and having extensions which form the neck 19 when the two sections of the bearings are together. Bracket arms 20 and 21 extend from the upper and lower cups 15 and 16 and are connected with the arms 22 of the yoke 23 and with the bracing bars 24. An oil inlet 25 is provided for each bearing so that oil may be fed into the bearing and thus permit the drum to turn easily. From an inspection of Figs. 1 and 2, it will be seen that when in use, this stalk cutter will have its bracings bars 24 connected with the lister beam 26 by bolts or other fasteners 27 and that the pins 28 of the yoke 23 will be carried by the bearings 29 at the end of this lister beam. It will be further seen that there has been provided a hood 30 positioned about the upper portion of the drum and connected with the yoke arms thus providing a shield for the drum and affording protection when the lister is in use. When it is desired to remove the drum it is simply necessary to withdraw the bolts 17 thus disconnecting the upper and lower sections of the bearings and permitting the bearings to be separated and the stub shaft removed therefrom. The stub shaft or bearing can therefore be easily cleaned or if one portion of one of the bearings should be broken, this section could easily be removed and a new one put in place.

I have therefore provided a stalk cutter attachment for a lister which is very efficient in operation and which can be easily cleaned or have repairs made thereto.

What is claimed is:—

1. A stalk cutter comprising a carrier bar, a yoke having depending arms and provided with a pin connected with the rear end of the carrier bar, bracing bars having their forward ends connected with the carrier bar and having their rear ends terminating adjacent the arms of the yoke, a drum including heads, cutting blades carried by the heads, stub shafts extending from the heads and terminating in enlarged spherical end portions, and bearings including upper and lower cups positioned about the enlarged ends of said stub shafts and having extensions forming necks to receive the stub shafts, and bracket arms extending from the upper and lower cups and connected with the bracing bars and the arms of said yoke.

2. A stalk cutter comprising a drum including cutting blades, stub shafts extending from the drum and provided with enlarged heads, a yoke provided with depending arms, bracing bars having their ends terminating adjacent the arms of said yoke, and bearings having upper cups connected with the arms of said yoke and lower cups engaging the upper cups and connected with the bracing bars, the cups being positioned about the heads of said stub shafts and having extensions forming necks through which the stub shafts pass.

In testimony whereof I affix my signature in presence of two witnesses.

ROY DE WITT THOMPSON.

Witnesses:
L. A. HOLLAR,
B. F. BENNETT.

Copies of this patent may be obtained for five cents each, by addressing the "Commissioner of Patents, Washington, D. C."